United States Patent [19]

Lovelock

[11] Patent Number: 4,894,922
[45] Date of Patent: Jan. 23, 1990

[54] HAND BEARING COMPASS

[75] Inventor: Richard Lovelock, Emsworth, England

[73] Assignee: Nautech Limited, Portsmouth, England

[21] Appl. No.: 160,843

[22] Filed: Feb. 26, 1988

[30] Foreign Application Priority Data

Feb. 26, 1987 [GB] United Kingdom ............... 8704560

[51] Int. Cl.⁴ .................. G01C 17/12; G01C 17/30
[52] U.S. Cl. ........................................ 33/272; 33/361
[58] Field of Search ................ 33/361, 355 R, 272, 33/273, 274, 281, 285, 278, 352, 354, 364

[56] References Cited

U.S. PATENT DOCUMENTS

| | | | |
|---|---|---|---|
| 2,955,357 | 10/1960 | Vegelhardt | 33/272 |
| 3,248,793 | 5/1966 | Anderson | 33/272 |
| 4,656,750 | 4/1987 | Pitt | 33/354 X |
| 4,668,100 | 5/1987 | Murakami | 33/361 X |

FOREIGN PATENT DOCUMENTS

| | | |
|---|---|---|
| 0113221 | 7/1984 | European Pat. Off. . |
| 659518 | 5/1938 | Fed. Rep. of Germany ........ 33/285 |
| 2582389 | 11/1986 | France . |
| 0082109 | 4/1986 | Japan ..................................... 33/361 |
| 8505444 | 5/1985 | PCT Int'l Appl. . |
| 101995 | 7/1941 | Sweden .................................. 33/272 |
| 561336 | 5/1944 | United Kingdom .................. 33/272 |

*Primary Examiner*—Harry N. Haroian
*Attorney, Agent, or Firm*—Cushman, Darby & Cushman

[57] ABSTRACT

A hand bearing compass comprises an electronic direction finding sensor fixed in a flat rectangular compass body. An actuating button causes the sensor to measure a magnetic bearing in dependence on the orientation of the compass body in a horizontal plane; measured bearings are stored in microprocessor memories for subsequent sequential recall to a display. To align the sensor horizontally in use the compass has longitudinal sights for visual alignment with a mark and a flat upper surface of the compass body for alignment with the horizon to facilitate levelling. Actuator and longitudinal sights are laterally spaced to avoid obscuring the latter, and arranged symmetrically about a median plane of the body so that use is possible in either hand.

14 Claims, 4 Drawing Sheets

Fig. 2.
Fig. 3.
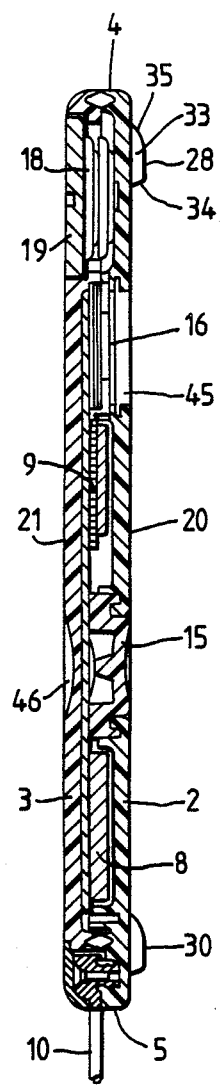
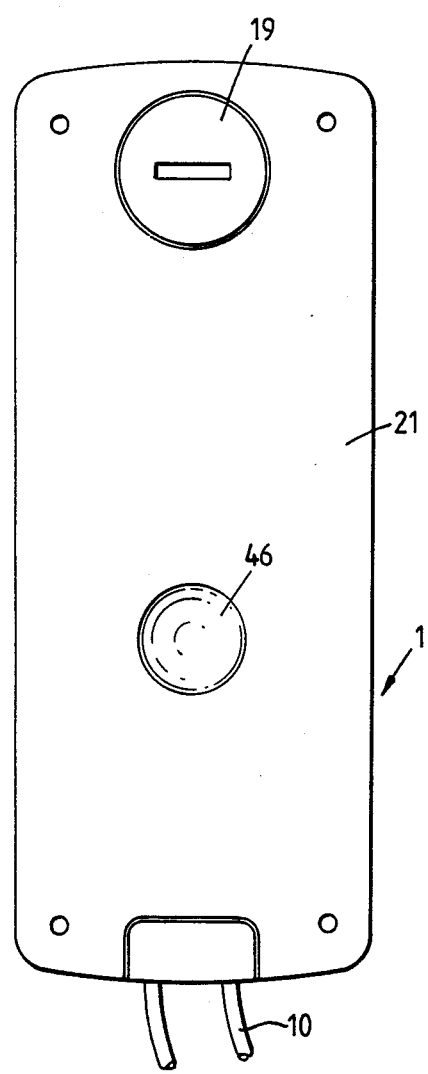

Fig. 4.
Fig. 5.
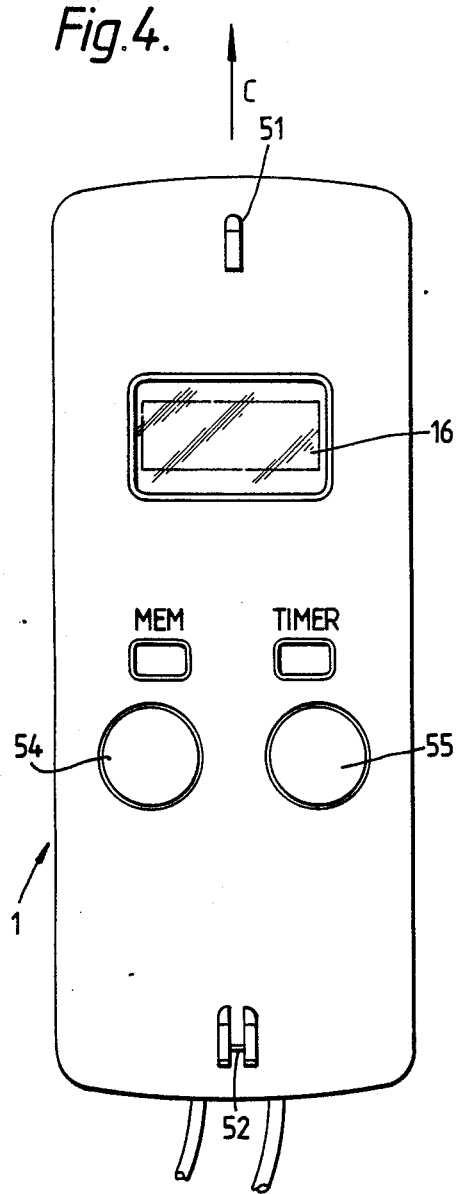
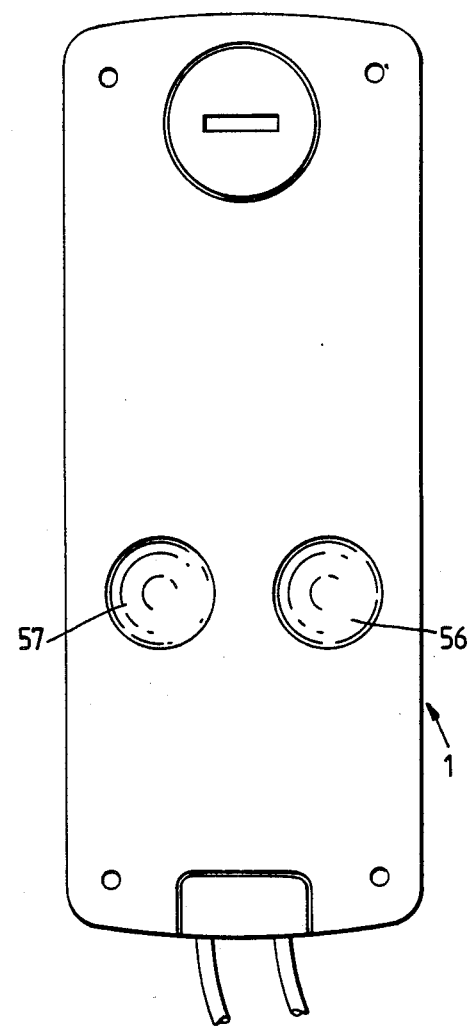

HAND BEARING COMPASS

FIELD OF THE INVENTION

This invention relates to hand bearing compasses.

BACKGROUND OF THE INVENTION

Hand bearing compasses are commonly used in navigation to take bearings of known visible marks in order to obtain a fix of position. The conventional hand bearing compass has a liquid damped compass card arrangement provided with a diametrical sight-line for alignment with the chosen distant mark. The body of the compass is usually adapted to be held in one hand, commonly having an elongate handle projecting axially downwardly beneath the card which makes the compass bulky in three dimensions and consequently inconvenient for storage and portability. To keep the card horizontal it is pendulously mounted on a central pivot, but this has the consequence that lateral acceleration caused by sea motion will cause rotary oscillation of the card. This makes the instrument difficult to read at sea.

Earlier U.S. Pat. No. 4,590,679, assigned to the same assignee as the present application, describes an electronic magnetic fluxgate that can be used as a direction finder. Such a sensor still needs to be held horizontally, because the earth's magnetic field has inclination and measurement of any component other than the horizontal will produce inconsistencies. If the sensor were provided with a gimbal system to keep it horizontal the gimbal would be disturbed by lateral accelerations caused by sea motion and errors would be introduced. Gimbal errors have therefore to be eliminated by fixing the magnetic fluxgate relative to the instrument body and finding some means of aligning the instrument body by hand in the horizontal plane.

SUMMARY OF THE INVENTION

An object of the present invention is to provide a hand bearing compass which can to some extent meet the demands of alignment, compactness, easy portability and operability preferably either right- or left-handed while avoiding the rotary oscillation errors and inconsistencies associated with conventional hand bearing compasses.

Accordingly, the invention provides a hand bearing compass comprising a compass body of generally flattened shape incorporating a direction-finding sensor and at least one manually operable actuator comprising a manually engageable portion e.g. a push button, for causing the sensor to measure a magnetic bearing in dependence on the orientation of the compass body in a substantially horizontal plane. For the sensor (preferably an electronic magnetometer) to measure bearings, its own direction-finding plane is to be aligned substantially horizontally. It is mounted in the compass body in such a manner that its direction-finding plane cannot tilt relative thereto, with that plane parallel to the upper of the flat body's upper and lower major surfaces, and the body upper surface is generally flat so as to provide an index for convenient visual alignment with a remote horizontal reference, such as the horizon, when the compass is used to take a bearing. Projecting from this flat surface is at least one longitudinal sight for alignment of the compass with the mark whose bearing is to be determined, and the viewing axis defined by each longitudinal sight is preferably parallel to the sensor direction-finding plane such that the flat index aligned with the horizon or other suitable reference and the longitudinal sight with the distant mark in question, the sensor plane will naturally be levelled into the horizontal alignment needed for accurate measurement. Furthermore the sights and actuator arrangement is such as to be substantially symmetrical about a longitudinal median plane of the compass, but with at least one actuator laterally spaced from the viewing axis or line of a sight.

The flat body of the present compass makes it neat and compact, such that it may be e.g. stored in a pocket or hung around the neck without inconvenience, while by having the sights and actuators out of line in this manner but in a symmetrical arrangement, the compass may be used in either hand without the fingers obscuring the sighting line. Furthermore, horizontal alignment of the sensor may be achieved without the need for gimballed mounting of the sensor and concomitant errors. In a preferred form there is one actuator, positioned symmetrically on the central longitudinal line of the compass, and two longitudinal sights disposed towards its respective sides. The compass is then balanced when held at the actuator.

Each longitudinal sight or sights preferable comprises one or more projections, such as longitudinally spaced foresight and rear sight, or a single elongate longitudinal ridge, defining the viewing axis so that the user can line the sight up with the mark whose bearing is being measured.

The preferred direction-finding sensor is a two-axis magnetometer, and in particular an electronic magnetic fluxgate system such as described in U.S. Pat. No. 4,590,679.

Such a system and associated circuitry may be associated with the or each actuator of the compass so as to measure a bearing in accordance with the orientation of the compass's viewing axis at the time the actuator is pressed. In particular the measured bearing value, as well as being displayed on a display of the compass, may be storable in a memory for later recall. This gives a substantial advantage over the conventional wet-card hand bearing compass in that very little time is needed in which to take a bearing; it is necessary merely to line up the sights and press the actuator.

A further, preferred, object is to provide a hand bearing compass adapted for taking a number of bearings which may be needed in rapid succession. There may then be electronic circuitry associated with the sensor comprising means, such as a microprocessor, for storing in memory the values of bearings measured by a sequence of operations of the actuator. The values of the bearings may then be recalled, in their original sequence, to a read-out display of the compass upon successive operations of a memory recall actuator. This may provide a substantial advantage e.g. when obtaining a fix of position using multiple bearings, since the bearings can be measured in rapid succession without the need for memorising or writing which may be extremely inconvenient or difficult in adverse conditions.

The or each actuator may be a push button in a flat upper face of the compass. It is preferred to provide a depression in the body directly opposite the button in the opposite face of the compass, so that it may be gripped naturally with a finger or thumb on the button and a thumb or finger engaging the depression, so as to avoid inadvertent tilting of the body when pressing the button.

The compass body is preferably thin and flat, so as to be easily carried in a pocket.

It is preferred that the longitudinal sight is directional, i.e. that it serves to distinguish the front of the compass from the back so as to avoid 180° errors in bearings. Where the longitudinal sight comprises plural projections defining the viewing axis, the front projections may differ from the rear ones. For example, a sight may comprise the fin-like lugs projecting from the flat surface and oriented lengthwise, the foresight being a single lug viewable end-on through the gap between a pair of similar lugs forming a rear sight. Both rear and foresights may be provided with illumination e.g. "beta lights", for use at night.

BRIEF DESCRIPTION OF THE DRAWINGS

By way of example, embodiments of the invention are now described with reference to the accompanying drawings, in which:

FIG. 2 is a section on A—A of FIG. 1;

FIG. 3 is a bottom view of the compass of FIG. 1;

FIG. 4 is a top view of a second embodiment;

FIG. 5 is a bottom view of the compass of FIG. 4, and

DETAILED DESCRIPTION OF THE PREFERRED EMBODIMENTS

Figure 1:
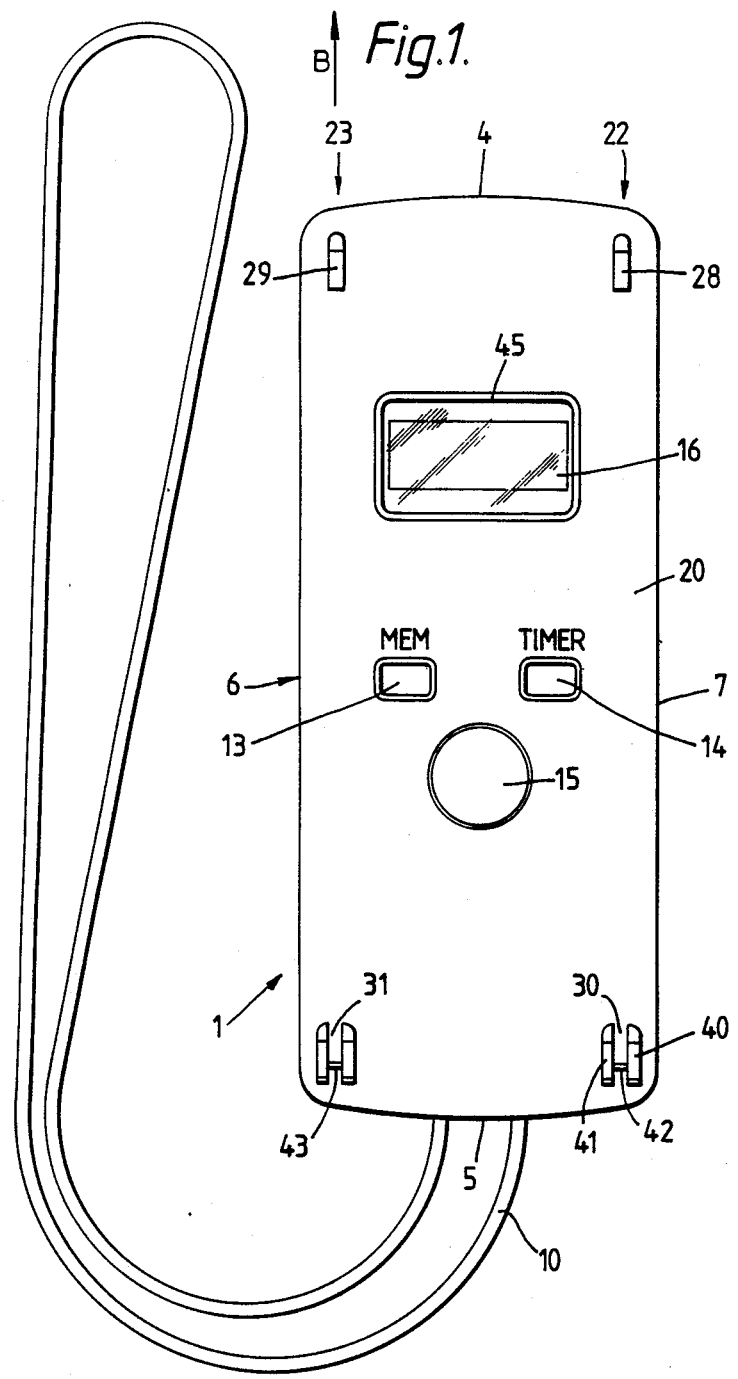
FIG. 1 is a top view of a hand bearing compass, being a first embodiment of the invention.

Referring to FIGS. 1,2 and 3 the first embodiment is a compass having a flat rectangular body 1 of plastic, formed by rectangular top and bottom casing parts 2,3 joined edge to edge. The short front and rear edges 4,5 of the body are slightly curved, and their corners with the long straight side edges 6,7 rounded so that the compass may conveniently be carried in a pocket. At the rear edge 5 the ends of a lanyard loop 10 are anchored and this may be used to hang the compass around the user's neck.

The casing parts 2,3 define an internal cavity containing working parts of the compass. Principal among these is a direction finding sensor comprising a two-coil magnetic fluxgate 8 for measuring the orientation in the plane of the compass body 1 of magnetic fields. The plane of the sensor 8 parallel with the general compass body plane is a direction-finding plane in which it is adapted to measure bearings. In view of the inclination of the earth's magnetic field it is necessary for the plane to be consistently horizontally aligned in use if consistent readings are to be obtained, and the manner in which this is done is described further below.

Figure 6:
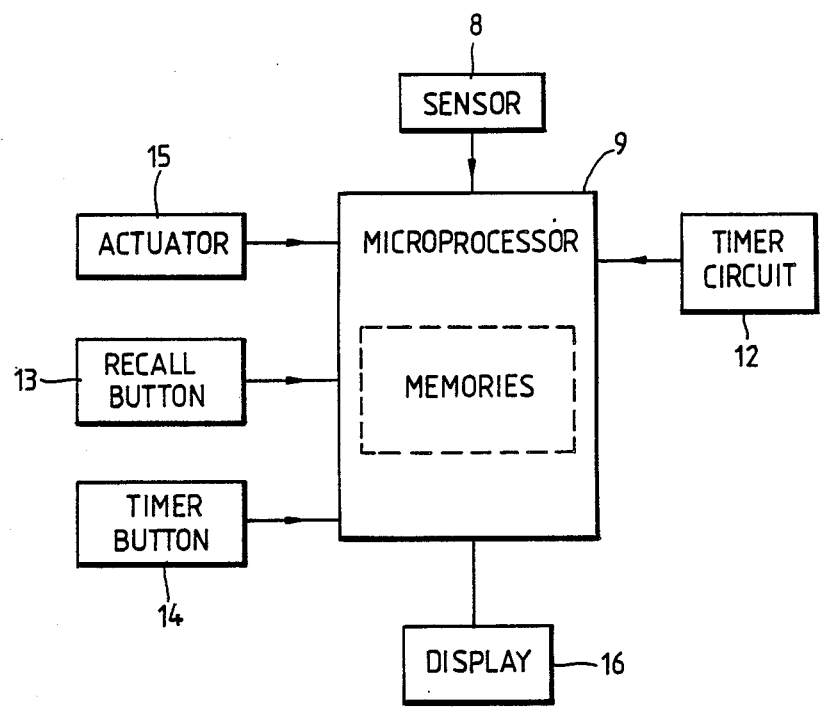
FIG. 6 is a schematic diagram of internal functional parts of the compass.

With reference to FIGS. 2 and 6, the compass casing also contains microprocessor circuitry 9 necessary for the working of the fluxgate 8, such that by pressing an actuating button 15 the orientation reading of the fluxgate may be both stored in a memory and visibly indicated on an LCD display 16. The microprocessor has nine memories 60 in which values of up to nine bearings measured on pressing of the button 15 can be stored in sequence. It also provides means for recalling these values in their measured sequence to the display 16 upon successive pressings of the memory recall button 13 (MEM). The circuitry further comprises a timing circuit 62 that can be actuated by the second auxiliary button 14 (TIMER). Power for the fluxgate circuitry is derived from batteries (not shown) in a battery chamber 18 accessible by way of a removable circular lid 19 underneath the front end of the body 1.

The body 1 has a flat upper surface 20, and the layout of features on this is symmetrical about the median section plane of FIG. 2. Right-hand and left-hand longitudinal sights 22,23 are provided towards those respective sides of the surface 20, equally spaced from the median plane. Each sight comprises a foresight 28,29 close to the respective front corner of the surface 20, and a corresponding rear sight 30,31 close to the respective rear corner. As may be seen from FIGS. 1 and 2 the foresights 28,29 are single fin-shaped lugs projecting from the surface 20 with flat sides 33, steeply sloping rear faces 34 and more gently sloping front faces 35, and the lengthwise direction of each lug is parallel with that of the compass as a whole. The rear sights comprise pairs of lugs similar to those of the foresights, the lugs 40,41 of each pair being spaced by a channel 42,43 such that parallel viewing axes or lines of sight are defined along the body 1 from the channels 42,43 to their respective foresights 28,29. The fluxgate system is set so as to measure the magnetic bearing parallel to these sight lines when aligned horizontally. A "beta" light, i.e. a fluorescent tritium-filled capsule, is provided in each of the rear sight channels 42,43 and on the rear face 34 of each foresight so that the sights can be used in the dark; other forms of illumination could be used.

The actuator—a flexible circular silicone rubber button 15—for the fluxgate device is mounted in the upper face 20 on the longitudinal centre line of the compass (and therefore equidistant from the two sight lines) slightly towards the rear of the body 1. Also centrally positioned but forward of the button 15, is a window 45 behind which the LCD display 16 of the fluxgate device is mounted.

The lower surface 21 of the compass body 1 is largely flat except for a circular depression 46 exactly opposing the position of the actuator button 15 on the upper face.

To use the compass in e.g. the right hand it is gripped in that hand with the thumb engaging the depression 46 and a finger on the button 15. Because the sight 23 on the left side is spaced laterally from the centre line, the viewing axis that it defines is not interrupted by the fingers gripping the body. The compass is then held up in front of the user's face and the left foresight 29, the channel 43 of the left rear sight and the mark whose bearing is being taken brought into line, viewing along the direction of arrow B (FIG. 1). Since foresight and rear sight are on the same level of the body and the mark chosen is typically distant, this naturally brings the longitudinal axis of the compass horizontal. The flat upper surface 20 of the compass, seen from its rear edge as a straight index, is then aligned with e.g. the horizon so that lateral horizontality is also achieved about the viewing axis, and the fluxgate device measures an accurate bearing of the viewing axis. This bearing is then taken by pressing the button 15, and because the right-hand thumb naturally engages the depression 46 directly under the button there is no tendency for the compass to twist out of alignment as this is done. The measured bearing is stored in the first memory of the microprocessor 9 and at the same time displayed on the LCD display 16. If a number of bearings are to be taken this can be done as above, and each is immediately stored in one of the nine memories. Thus when taking a set of bearings for e.g. a fix of position, it is necessary simply to aim the compass at each mark and press button 15, without any need to look at the display or memorise numbers. The bearing values are then brought back to the display 16 in the order in which they were taken, using the recall button 13.

It will be apparent that the compass is equally well adapted for use in the left hand, in which case the right hand sight 22 would be used.

Advantage in use is also derived from the loop lanyard 10 attached to the extremity of the compass body 1. Normally this is worn around the neck or wrist or attached to clothing; when in use it can be put under slight tension to steady the compass as it is held centrally between thumb and finger of one hand.

FIGS. 4 and 5 show a second embodiment with a body 1 corresponding generally in shape with that of the first embodiment, and provided with a similar fluxgate direction sensor, microprocessor 9 and display 16. However in this case there is only one longitudinal sight 51,52 on the flat upper surface of the body, the line of sight being exactly central of the body in its median plane. Instead of one there are two actuating buttons 54,55 for the sensor, disposed symmetrically either side of the sight line, and each has its corresponding depression 56,57 on the undersurface of the body. With this embodiment sighting is always performed along the same line C (FIG. 4), while for right-hand use the right-hand button 55 is used, for left-hand use the left-hand button 54.

I claim:

1. A hand bearing compass for measuring magnetic bearings in a substantially horizontal plane, the compass comprising:
   (a) a compass body of generally thin and flat shape, the body having upper and lower major surfaces and a longitudinal median plane, said upper major surface being generally flat;
   (b) a direction-finding sensor mounted in the compass body, the sensor having a direction-finding plane to be aligned substantially horizontally in use, and means mounting the sensor in the body with the direction-finding plane thereof held fixed substantially parallel to the flat upper body surface, whereby said surface provides an index for visual alignment with a remote reference to level the direction-finding plane laterally in use;
   (c) a first longitudinal sight projecting from the flat upper surface of the compass body, said first longitudinal sight defining a first viewing axis for visual alignment with a bearing to be measured, said first viewing axis being spaced laterally from the longitudinal median plane on one side and parallel thereto;
   (d) a second longitudinal sight projecting from the flat upper surface of the compass body, said second longitudinal sight defining a second viewing axis for visual alignment with a bearing to be measured, and said second viewing axis being spaced laterally from the longitudinal median plane on the other side from said first viewing axis, and parallel thereto;
   (e) means for actuating said sensor, said means comprising a manually engageable actuator portion disposed on the compass body on the longitudinal median plane of the compass body between the first and second viewing axes, whereby the actuator portion and first and second longitudinal sights form a substantially symmetrical array about the longitudinal median plane such that the compass body can be held by its major surfaces between the finger and thumb of either hand with the manually engageable actuator portion engaged by that hand and with one of said viewing axes unobscured;
   (f) a display and a memory recall actuator on the compass body; and
   (g) electronic microprocessor circuitry in said compass body, said circuitry being connected to the actuator portion, the sensor, the display and the memory recall actuator, and comprising:
      (i) means for causing said sensor to measure the value of the magnetic bearing along the viewing axis upon operation of the manually engageable actuator portion, and to display the value on the display;
      (ii) memory means for storing a plurality of magnetic bearing values so measured, and
      (iii) memory recall means for recalling plural stored bearing values to the display upon operation of the memory recall actuator.

2. A hand bearing compass as claimed in claim 1 wherein each longitudinal sight comprises plural upward projections from said flat upper surface.

3. A hand bearing compass as claimed in claim 1 wherein the direction finding sensor comprises an electronic magnetic fluxgate.

4. A hand bearing compass as claimed in claim 1 wherein each longitudinal sight comprises a foresight and a rear sight for defining said viewing axis, the foresight and rear sight being spaced longitudinally and defining the viewing axis substantially parallel with the direction-finding plane.

5. A hand bearing compass as claimed in claim 4 wherein the foresight and rear sight comprise respective upward projections from the flat upper surface.

6. A hand bearing compass as claimed in claim 1 wherein the actuator portion is provided on one side of said major surfaces and the other said surface has a depression opposite the actuator portion, whereby actuator portion and depression are engageable by finger and thumb of one hand.

7. A hand bearing compass as claimed in claim 1 further comprising a flexible lanyard fixed to an extremity of the compass body.

8. A hand bearing compass for measuring magnetic bearings in a substantially horizontal plane, the compass comprising:
   (a) a compass body of generally thin and flat shape, the body having upper and lower major surfaces and a longitudinal median plane, said upper major surface being generally flat;
   (b) a direction-finding sensor mounted in the compass body, the sensor having a direction-finding plane to be aligned substantially horizontally in use, and means mounting the sensor in the body with the direction-finding plane thereof held fixed substantially parallel to the flat upper body surface, whereby said surface provides an index for visual alignment with a remote reference to level the direction-finding plane laterally in use;
   (c) a central longitudinal sight projecting from the flat upper surface of the compass body, defining a viewing axis substantially in said median plane for visual alignment with a bearing to be measured;
   (d) means for actuating the sensor, said means comprising
      (i) a first manually engageable actuator portion disposed on the compass body spaced laterally from the median plane on one side thereof;

(ii) a second manually engageable actuator portion disposed on the compass body spaced laterally from the median plane on one side thereof;

the central longitudinal sight and first and second actuator portions forming a substantially symmetrical array about the median plane such that the compass body can be held by its major surfaces between the finger and thumb of either hand with one of said actuator portions engaged by that hand and the viewing axis unobscured;

(e) a display and a memory recall actuator on the compass body; and (f) electronic microprocessor circuitry in said compass body, said circuitry being connected to the sensor, the display, the memory recall actuator and the means for actuating the sensor, and comprising, (i) means for causing said sensor to measure the value of the magnetic bearing along the viewing axis upon operation of either one of said first and second actuator portions, and to display the value on the display.

(ii) memory means for storing a plurality of magnetic bearing values so measured, and (iii) memory recall means for recalling plural stored bearing values sequentially to the display upon operation of the memory recall actuator.

9. A hand bearing compass as claimed in claim 8 wherein each longitudinal sight comprises plural upward projections from said flat upper surface.

10. A hand bearing compass as claimed in claim 8 wherein the direction-finding sensor comprises an electronic magnetic fluxgate.

11. A hand bearing compass as claimed in claim 8 wherein each longitudinal sight comprises a foresight and a rear sight for defining said viewing axis, the foresight and rear sight being spaced longitudinally and defining the viewing axis substantially parallel with the direction-finding plane.

12. A hand bearing compass as claimed in claim 11 wherein the foresight and rear sight comprise respective upward projections from the flat upper surface.

13. A hand bearing compass as claimed in claim 8 wherein the actuator portion is provided on one of said major surfaces and the other said surface has a depression opposite the actuator portion, whereby actuator portion and depression are engageable by finger and thumb of one hand.

14. A hand bearing compass as claimed in claim 8, further comprising a flexible lanyard fixed to an extremity of the compass body.

* * * * *